US010749557B1

(12) United States Patent
Griffin et al.

(10) Patent No.: US 10,749,557 B1
(45) Date of Patent: Aug. 18, 2020

(54) ADAPTIVE SPUR PROCESSING

(71) Applicant: BAE Systems Information and Electronic Systems Integration Inc., Nashua, NH (US)

(72) Inventors: Gregory T. Griffin, Hollis, NH (US); Richard B. Elder, Jr., Bedford, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 16/510,244

(22) Filed: Jul. 12, 2019

(51) Int. Cl.
*H04B 1/10* (2006.01)
*H04B 17/391* (2015.01)
*H04B 1/18* (2006.01)
*G06N 20/00* (2019.01)

(52) U.S. Cl.
CPC ............... *H04B 1/109* (2013.01); *H04B 1/18* (2013.01); *H04B 17/3913* (2015.01); *G06N 20/00* (2019.01)

(58) Field of Classification Search
CPC ................ H04B 7/18563; H04B 1/109; H04B 17/3913; H04B 1/18; H04L 25/0262; H04L 27/156; H04L 7/042; H04L 1/20; H04L 25/0222
See application file for complete search history.

(56) References Cited

U.S. PATENT DOCUMENTS 3,396,395 A 8/1968 Ball et al.
4,547,727 A 10/1985 Tsui et al.
5,321,847 A 6/1994 Johnson, Jr.
5,603,087 A 2/1997 Shultz
5,818,517 A 10/1998 Hudson et al.
(Continued)

OTHER PUBLICATIONS

Benson et al., "Adaptive Thresholding for High Dual-Tone Signal Instantaneous Dynamic Range in Digital Wideband Receiver", 2010 IEEE Instrumentation & Measurement Technology Conference Proceedings, Date of Conference: May 3-6, 2010, Austin, TX, USA, IEEE Jun. 17, 2010, 4 pages.
(Continued)

*Primary Examiner* — Khanh C Tran
(74) *Attorney, Agent, or Firm* — Scully Scott Murphy & Presser PC; Scott J. Asmus

(57) ABSTRACT

A system and method for adaptive spurious signal (spur) processing at a broadband RF receiver. Spur processing addresses the detection of spurs generated by the receiver when high level RF signals are present at its input. The spurs can lead to undesired false detections. Based on signal parameters of the received RF signal, the system detects a strong enough real signal that would cause a spur and prevent generation of false reports. The adaptive spur mitigation scheme uses multiple detection and report thresholds to enable false report rejection with an improved high probability of rejecting false detections, while minimizing the adverse effects on multi-tone dynamic range. The necessary detection and report thresholds are generated based on a system level behavioral model that predicts the performance of several different types of spurs as a function of signal parameters. The thresholds are tuned to match the behavior of the dominant spur.

24 Claims, 9 Drawing Sheets

(56) References Cited

U.S. PATENT DOCUMENTS

| | | | | |
|---|---|---|---|---|
| 6,043,771 | A * | 3/2000 | Clark | G01S 7/021 342/13 |
| 6,130,920 | A * | 10/2000 | Powell, II | H04L 7/0062 375/343 |
| 6,198,779 | B1 * | 3/2001 | Taubenheim | H04B 1/28 375/286 |
| 7,082,172 | B1 | 7/2006 | Pringle et al. | |
| 7,427,942 | B2 | 9/2008 | Catabia | |
| 7,542,812 | B2 | 6/2009 | Stroili et al. | |
| 8,135,372 | B2 | 3/2012 | Collins, III et al. | |
| 8,537,050 | B2 | 9/2013 | Freeman et al. | |
| 8,774,747 | B2 | 7/2014 | Hyun et al. | |
| 8,803,730 | B2 * | 8/2014 | Jiang | G01S 7/021 342/159 |
| 8,938,203 | B2 | 1/2015 | Ancora et al. | |
| 8,942,656 | B2 | 1/2015 | Manku et al. | |
| 8,977,211 | B1 | 3/2015 | Tinella et al. | |
| 8,977,311 | B2 | 3/2015 | Osterling et al. | |
| 8,983,454 | B2 | 3/2015 | Bevan et al. | |
| 8,989,690 | B2 | 3/2015 | Devries et al. | |
| 9,479,207 | B2 | 10/2016 | Henderson et al. | |
| 9,596,120 | B2 | 3/2017 | Yamanouchi | |
| 2009/0096519 | A1 * | 4/2009 | El-Agha | H03D 3/006 329/300 |
| 2010/0285849 | A1 * | 11/2010 | Porjo | G01W 1/16 455/574 |
| 2011/0026643 | A1 * | 2/2011 | Ruelke | H03G 3/3068 375/319 |
| 2016/0054433 | A1 | 2/2016 | Barrow | |

OTHER PUBLICATIONS

Gee, “Radar Warning Receiver (Rwr) Time-Coincident Pulse Data Extraction and Processing”, 2012 IEEE Radar Conference, Date of Conference: May 7-11, 2012, Atlanta, GA, USA, IEEE Jun. 8, 2012, pp. 0752-0757.

Gooley, “Detecting and Identifying Spurious Signals Generated in Radar Receivers”, Defense Science and Technology Organisation, Australia, Radio Receivers and Associated Systems, Sep. 26-28, 1995, Conference Publication No. 415, IEE 1995, pp. 119-122.

Lanzerotti et al., “Ultraweak Simultaneous Signal Detection With Theoretical Phase Calculation Approaches”, IEEE Transactions on Aerospace and Electronic Systems, vol. 51, No. 2, Apr. 2015, pp. 884-893.

Rabideau, “Hybrid Mitigation of Distortion in Digital Arrays”, MIT Lincoln Laboratory, IEEE International Radar Conference, 2005, Date of Conference: May 9-12, 2005, Arlington, VA, USA, IEEE Jun. 6, 2005, 6 pages.

Salari, et al., “Blind Compressive-Sensing-Based Electronic Warfare Receiver”, IEEE Transactions on Aerospace and Electronic Systems, vol. 53, No. 4, Aug. 2017, pp. 2014-2030.

Simoneau et al., “Multitone Feedback Through Demodulating Log Detector for Detection of Spurious Emissions in Software Radio”, IEEE Transactions on Circuits and Systems-I: Regular Papers, vol. 54, No. 10, Oct. 2007, pp. 2222-2228.

* cited by examiner

ADAPTIVE SPUR PROCESSING

STATEMENT REGARDING FEDERALLY SPONSORED RESEARCH OR DEVELOPMENT

This invention was made with government support under N00019-12-C-0004 awarded by U.S. Department of Air Force. The government has certain rights to this invention.

FIELD

Embodiments of the present disclosure generally relate to Radio Frequency (RF) signal receivers for broadband RF systems, and particularly to an advanced processing architecture for mitigating spurious signal responses in a wideband RF receiver sub-system.

BACKGROUND

For broadband applications, Radio Frequency (RF) receivers are exposed to complex environments with multiple simultaneous signals. Strong signals in the environment can create spurious signals within the RF receive path hardware, with signal levels equal to or exceeding those of the desired signals of interest. When spurs exceed the Minimum Detectable Signal (MDS) level of the receiver system, they may result in false reports that greatly degrade the utility of the system. There are many potential sources of spurious signals in typical RF hardware used in broadband receiver subsystems including:

- Single-Tone Harmonic Spurs (i.e., second and 3rd harmonic).
- Multi-Tone Intermodulation Spurs
- Mixer spurs resulting from complex interactions between Local Oscillator (LO), RF, and IF ports
- Spurs that exist on Local Oscillators
- Leakage Spurs These potential spurious sources have different behavior characteristics that define the RF power and frequency of the spur relative to the strong signal that causes them. For 2nd order single harmonic spurs, a strong signal at frequency F1 causes a weaker spurious response at frequency 2*F1. For every one dB (1 dB) increase in power of the strong signal, the spur amplitude increases by two dB. This is typically quantified by a "Second Order Intercept Point" metric. For higher order spurs, the ratio that the spur increases per unit increase in strong signal power can vary significantly, as quantified by other intercept point metrics. As the order increases, some of the spurs may be less troublesome than others because an RF preselection filter may provide some rejection.

SUMMARY

A system, method and computer program product is provided that rejects potential spurious detections that are generated by the wideband receiver in the presence of strong input signals. The algorithm uses multiple detection and report thresholds to optimize the ability to reject false reports due to spurs, while maximizing an effective multi-tone dynamic range.

A system, method and computer program product for detecting spurious or valid signals at an RF receiver path over a frequency band in which spurious signals are generated based on a receiver hardware state.

In one embodiment, the system, method and computer program product performs multi-level threshold detection where each detection level is optimized based on a configured hardware state of the receiver.

In one embodiment, the multiple detection and report thresholds optimizes the effective range over which peak multi-Tone Dynamic range is achieved, while maintaining a low false report rate.

In one embodiment, the system, method and computer program product performs multi-level threshold detection where each detection level is of decreased dynamic range.

According to one aspect, there is provided an adaptive spurious signal detection system for a RF signal receiver. The detecting system comprises: a multiple-level threshold detector for receiving a sampled RF signal from the RF receiver system at a given point of time and comparing the sampled RF signal against a plurality of detection threshold levels, the multi-level threshold detector generating a corresponding multi-bit RF tag message, indicating a highest level of the sampled RF signal for the given point in time; a correlator unit configured to associate an intermediate frequency (IF) signal detection event at the given point of time with a corresponding RF tag level of the generated multi-bit RF tag message for the given point in time, the correlator unit outputting a correlated RF tag message based on the association; a pulse report generator for generating a corresponding pulse report including the correlated RF tag message and a measured signal parameter of a corresponding detected IF signal associated with the IF signal detection event; and a processor using the correlated RF tag message and the measured signal parameter of the detected IF signal to reject the pulse report as a spurious signal detection or pass the pulse report as a valid signal detection.

In another aspect, there is provided a method for adaptive spurious signal detection in a radio frequency (RF) receiver system. The method comprises: obtaining, at a given point in time, an RF signal level sample of received RF signals; comparing, at a multiple-level threshold detector, the RF signal level sample against a plurality of detection threshold levels indicating whether the received RF signals are a signal of interest or a spurious signal, and generating a multi-bit RF tag message indicating a highest level of the RF signal level samples for the given point in time; associating, using a correlator unit, an IF signal detection event at the given point of time with a corresponding RF tag level from the multi-bit RF tag message for the given point in time, and outputting a correlated RF tag message; receiving, at a processor, a corresponding pulse report including the correlated RF tag message and a set of IF signal parameters of a corresponding detected IF signal associated with an IF signal detection event; and based on the correlated RF tag message and the signal parameters of the pulse report, perform one of the following based on a report threshold: rejecting the pulse report as a spurious signal detection; or passing the pulse report as a valid signal detection.

In a further aspect, there is provided a computer program product for performing operations. The computer program product includes a storage medium readable by a processing circuit and storing instructions run by the processing circuit for running a method. The method comprises steps to: receive first data relating to a receiver hardware configuration that receives and processes RF signals; run a behavioral model for simulating behavior of the receiver hardware configuration, the behavioral model trained to predict a performance of types of spurious RF signals based on a simulated receiver hardware behavior; correlate a combination of hardware configuration parameters of the simulated receiver hardware with a predicted RF spur detection level and corresponding RF tag level of each of the types of spurious RF signals; and automatically generate a detection threshold and a corresponding report threshold based on the predicted RF spur detection level and corresponding RF tag level; and store the detection threshold and the corresponding report threshold for use in detecting the types of spurious RF signals.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure.

The present disclosure provides, for a wideband receiver sub-system, a spur mitigation scheme that has the following characteristics: 1) High probability of rejecting false detections; 2) Minimal impact on multi-tone dynamic range; 3) Ability to operate in environments with agile signals; 4) Effective performance for a wide range of spur types; and 5) Low implementation complexity. Spurious signal types may include non-linear transformations when strong signals received are converted to digital signals (non-linear transfer condition) and can include artifacts, e.g., spurious signals, mixer spurs due to interactions with local oscillator, or harmonics of signals due to the non-linearity (non-linear responses). These spurs are detected and, in some instances, spurs are reported to the user for further action and reduce instances of false detections. The system implements methods to reject the spurs (reject false detections) while minimizing impact on dynamic range of the receiver.

Figure 1:
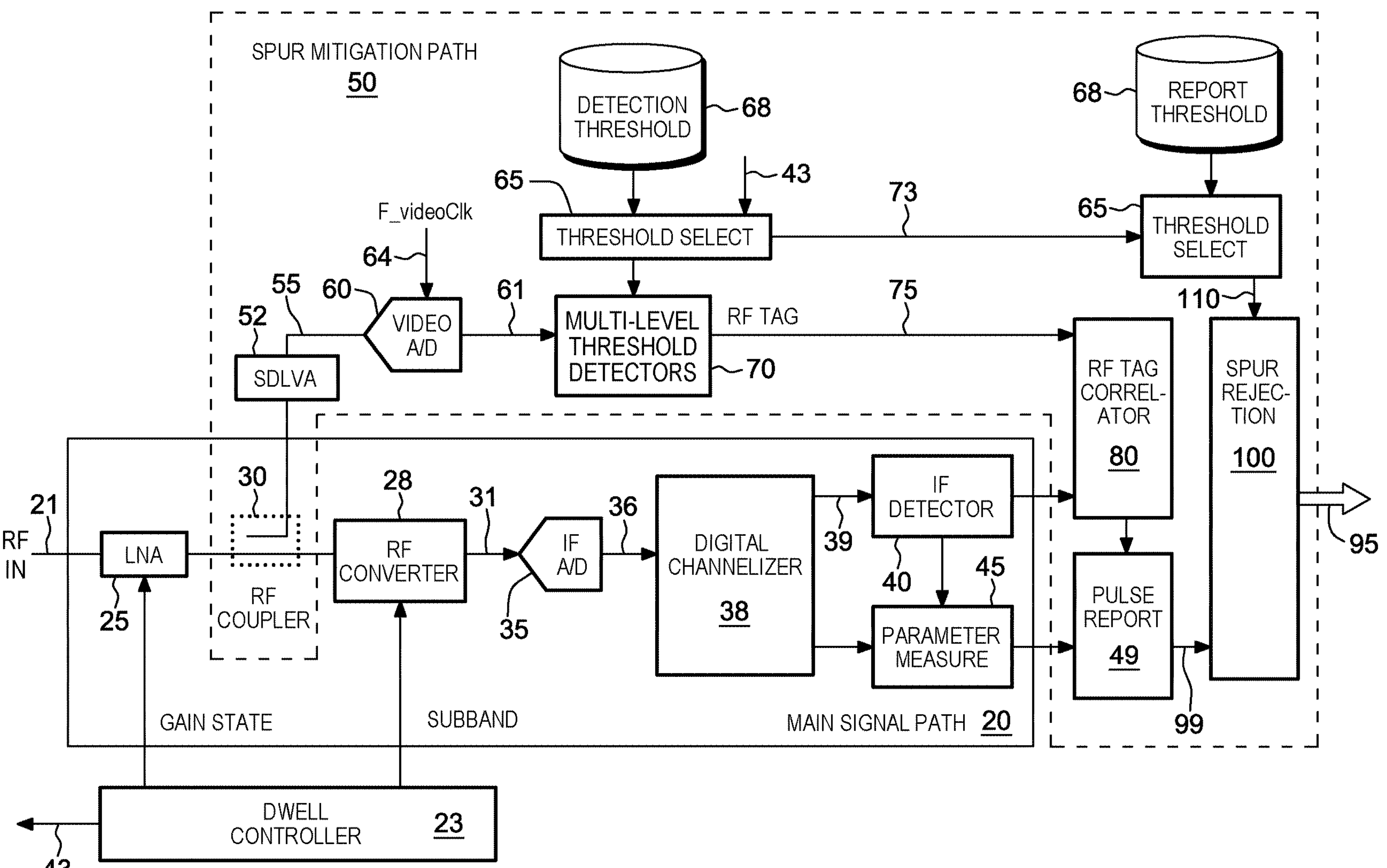
FIG. 1 illustrates a general block diagram of an example broadband receiver system implementing embodiments of the present invention.

FIG. 1 is a general block diagram of an example broadband receiver system 10 including individual multi-chip modules that together constitute the broadband receiver. In an embodiment, the receiver 10 is a wide bandwidth (broadband) receiver that incorporates analog/RF and digital components. In an implementation, the analog/RF components are incorporated as a semiconductor receiver-on-a-chip employing modularized components of silicon-germanium technology, and digital components are implemented in Field Programmable Gate arrays. However, the principles are readily applicable to other analog/RF technologies based on GaAs, InP, or other semiconductor processes. Likewise, the digital components may be implemented using ASICs (Application Specific Integrated Circuits), CPUs (Central Processing Units), GPUs (Graphical Processing Units), or other technologies. Each has distinct advantages and disadvantages depending on the required application. The receiver 10 includes main RF signal receiver/processing path 20 (i.e., RF signal path) and an adaptive spur mitigation path 50.

In FIG. 1, the key components of the main signal receiver subsystem (i.e., RF signal path) 20 include a broadband RF signal input 21 from an antenna (not shown) to a low-noise amplifier (LNA) component 25. RF signal input 21 can include an RF signal feed and can include modulated or unmodulated waveforms. In operation at a high level, after the receiver 10 intercepts a pulse, measurements are taken and the measured information is formatted as a raw Pulse Parameter Report (PPR) 99 which is passed to Spur Rejection Processing 100. The Spur Rejection processing filters out pulses that meet conditions which indicate the pulse is likely a spur, resulting in filtered Pulse Parameter Reports 95 that are suitable for subsequent system level processing.

In embodiments, a Pulse Parameter Report (PPR) embodies a combination of radar pulse measurements combined into a single data packet with the PPR including some detected radar parameters such as: Pulse Amplitude (PA), Pulse Width (PW), Frequency, and other possible parameters.

The RF signal path 20 receiving RF input signal 21 in this example includes an RF coupler 30 for sampling the broadband RF Power level signal input. In an embodiment, the pass-through RF input signal 21 is down-converted by the RF converter element 28 by mixing the RF input signal with one or more Local Oscillator signals (not shown) to generate a lower Intermediate Frequency (IF) signal 31. A dwell controller element 23 sets the RF converter and LNA to the proper frequency/gain state. For example, an RF mixer is used in a single down-conversion stage, with the mixer being driven by local oscillators from a clock and/or local oscillator to generate the down-converted IF mixer output 31. Continuing along RF signal path 20, as shown in FIG. 1, the down-converted IF signal 31 is digitized using high frequency (e.g., GHz) sample rate analog/digital (A/D) converter 35 and the digitized IF signal 36 is input to a digital channelizer 38 that is configured to channelize the received signal 36 into a number of narrower bandwidth sub-channels for digital processing. At IF detector block 40, each narrower bandwidth sub-channel signal output 39 of digital channelizer 38 is subject to processing to detect existence of any signal in the related frequency band (e.g., spectrum sensing) to obtain digital IF detections. A further parameter measurement block 45 takes measurements of parameters of any detected signal at each respective IF sub-band signals detector block 40.

As further shown in FIG. 1, the RF coupler 30 at the RF signal path 20 receives the RF input signal 21 and couples the received broadband RF input signal for processing in the Spur Mitigation processing path 50. Ideally, the RF coupler 30 provides very low through loss between the Low Noise Amplifier (LNA) 25 and RF converter (tuner) 28, with a 10 dB to 20 dB coupling factor to a Successive Detection Log Video Amplifier (SDLVA) 52 in the spur mitigation processing path 50. In one embodiment, RF coupler 30 exhibits a flat gain response as the gain flatness of the coupling factor tends to provide more successful implementation of the spur mitigation process. In an embodiment, any error in the coupling factor is to be accounted for in a threshold determination algorithm.

In an embodiment, the SDLVA 52 receives the coupled RF input signal and provides video output signal 55 whose envelope logarithmically tracks the broadband input waveform. The SDLVA 52 is of sufficient sensitivity to be able to detect at the lowest input signal level where a spur could be produced, while also having sufficiently high maximum input power to accommodate the strongest signal that is expected in the environment.

In an embodiment, a video A/D converter 60 then samples the strength of the signal output 55 of the SDLVA 52. In an embodiment, the A/D converter 60 samples the output 55 of the SDLVA (Log Amp) 52 at a rate sufficient to capture the video bandwidth of the modulated RF signal according to an input clock (F_videoCLK) source 64. Typically, this rate matches the decimated output clock rate of the digital channelizer 38, for convenience in the process of correlating an RF Tag with the digital IF detections out of the IF detector unit of RF signal path 20.

Figure 2:
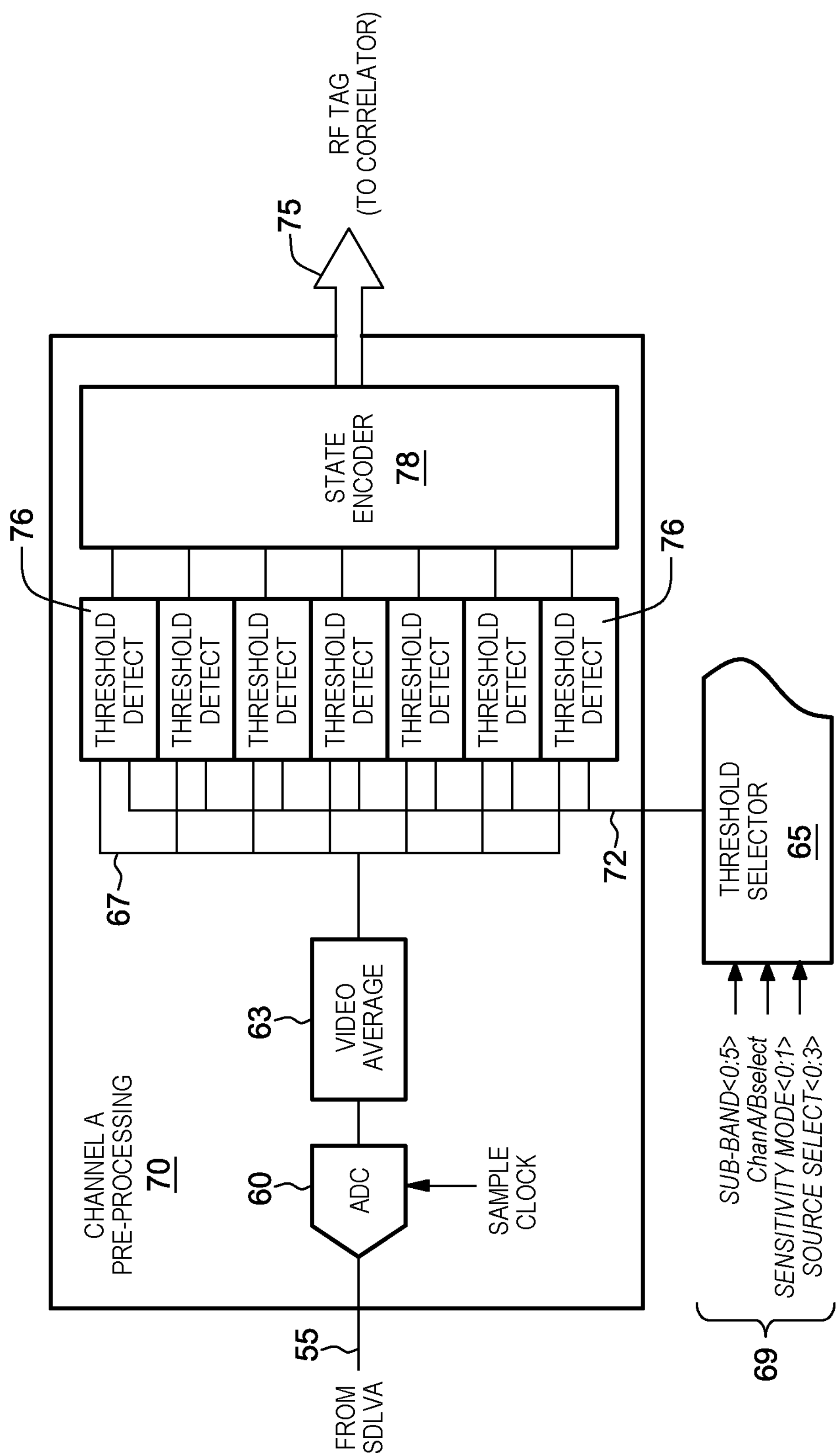
FIG. 2 illustrates implementation of multi-level threshold detectors shown in FIG. 1.

Continuing along the spur mitigation signal path 50, the sampled output signal 61 of the video A/D 60 is input to a multi-level threshold detector 70 which is configured to compare digitized Video A/D output 61 with multiple pre-programmed detection thresholds. In an embodiment, a threshold selector 65 is invoked to select each detection threshold(s) from a memory storage system 68 that stores a data set of detection thresholds. In an embodiment, the threshold selector 65 selects a detection threshold as a function of the active hardware state 73 of the RF signal path (e.g., Gain state, Sub-band), to provide a high level of resolution in selecting the optimal threshold. In an exemplary implementation, each hardware state has seven (7) unique programmable thresholds, which are encoded into a 3-bit RF Tag message 75 as illustrated in FIG. 2. The invention is readily scalable to variations which incorporate more or less hardware states, and coding schemes with different bit counts, e.g., greater than 3-bits. As the number of unique states is increased, the multi-tone dynamic range performance improves, until a point where the performance benefit that is realized does not warrant the additional implementation complexity. Conversely, as the number of states is decreased, the implementation complexity is reduced, at the expense of reduced dynamic range benefit.

In an embodiment, an automated algorithm is implemented for generating the necessary detection threshold and report thresholds which are stored in a same or different data storage system 68. These thresholds are computed based on a high fidelity system level behavioral model that predicts the performance of several different types of spurs at least as a function of system gain state and frequency. This information is used to tune the detection thresholds to match the behavior of the dominant spurs. An automated approach is used to define optimum thresholds for multiple frequency ranges and gain states.

FIG. 2 depicts the functional blocks of the multi-level threshold detector 70 of FIG. 1. As shown in FIG. 2, threshold selector 65 receives data 69 from the RF signal path 20 representing the broadband RF receiver's current active hardware state 73 (e.g., parameters such as Gain state (e.g., a Sensitivity Mode), a Sub-band the tuner is tuned to, Channel A/Channel B select, and/or a Source Select parameter indicating a type of source (front end/aperture) combination) and determines a detection threshold 72 responsive to the current hardware state 69 data parameters. Threshold selector unit 65 further defines a threshold at each comparator unit 76 of the threshold detector 70. In an embodiment, the detection thresholds are pre-determined based on an algorithm shown and described with respect to FIG. 9 and stored in detection threshold memory 68, e.g., in a look-up table. The thresholds depend on the receiver subbands and gain states, as commanded by the active dwell state 43 of dwell controller unit 23. In an embodiment, as shown in FIG. 1, the dwell controller 23 cycles through a series of tuner subbands and gain states. Active Dwell State 43 is the state that the dwell controller is in at a given point in time (e.g., the tuner subband and gain state). The spur detection and report thresholds are different for each of these states, so the algorithm that generates these values has to generate a unique value(s) for each state. During operation, the spur mitigation process looks up the proper detection/report thresholds for the current active dwell state 43 that it is operating in at the given point in time. A given point of time is a point in real time to conduct a sampling, e.g., a sampling time point. The threshold select unit 65 select the proper threshold from the lookup table 68 based on the received active dwell state 43.

In the pre-processing performed at the multi-level threshold detector 70 of FIG. 2, the received video output signal 55 whose envelope logarithmically tracks the broadband input waveform is digitized and averaged by a video averaging component 63. The video averaging component 63 generates an averaged video output signal 67 which is input to each of the comparator units 76. In this example (non-limiting) embodiment, there are seven (7) comparator units, but this may scale up or down for alternate embodiments. Each comparator unit 76 is a different threshold level detector and functions to compare a respective video output signal average 67 against the determined detection threshold 72. The outputs of the comparisons are received at a state encoder 78 configured to encode the output of the respective comparators 76 into a coded RF tag word signal 75. In an embodiment, the coded RF tag signal 75 represents the highest level that is present for a given sampled point in time. For example, an RF tag report of '0' indicates that none of the thresholds have been crossed. In an embodiment, eight (8) potential spur detection states are encoded into a 3-bit, time interleaved word 75.

Figure 3:
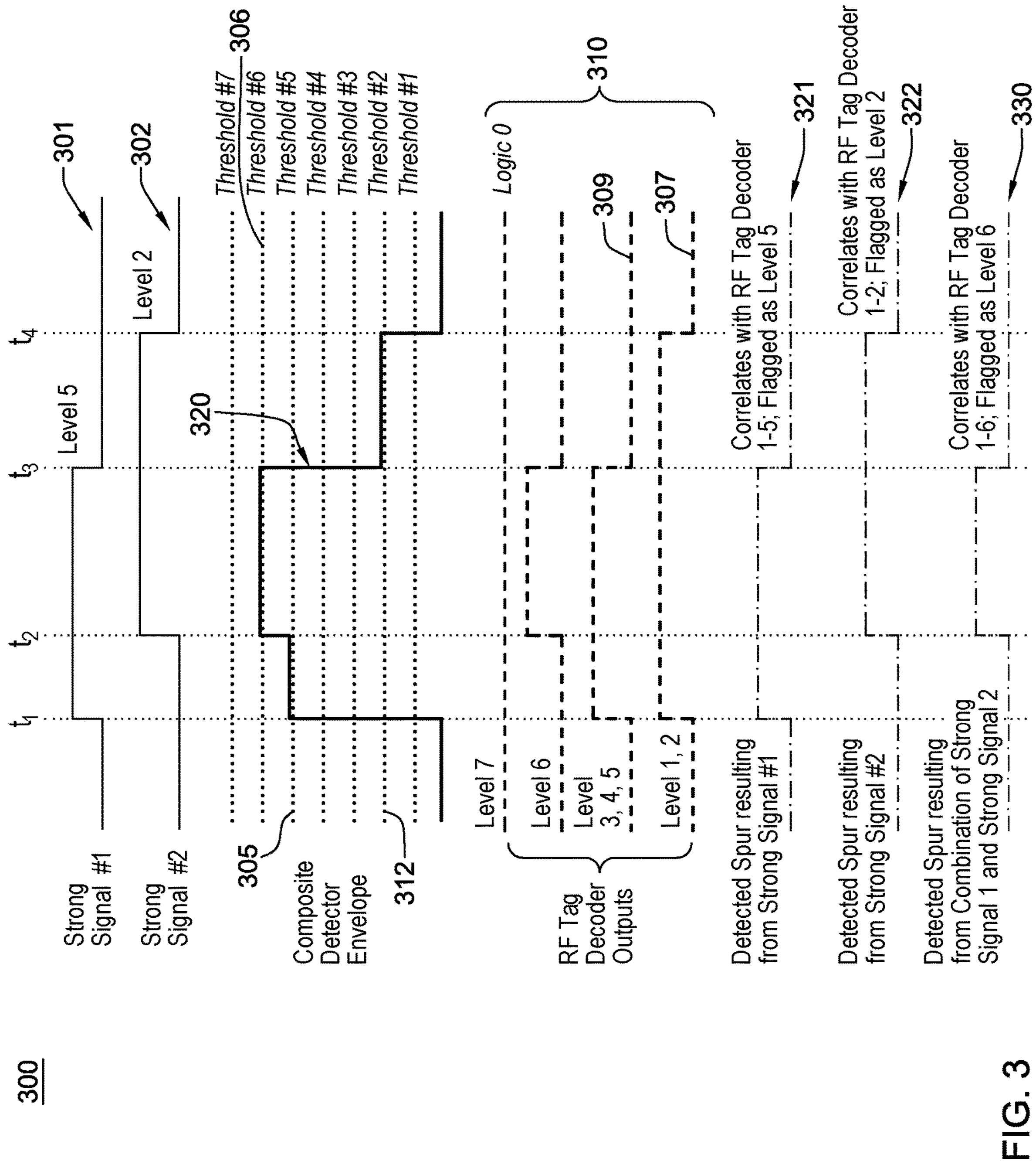
FIG. 3 illustrates conceptual operation of multi-level threshold detectors according to an embodiment.

FIG. 3 depicts an example timing diagram depicting operation 300 of the multi-level threshold detector element 70 of FIG. 2. In the example depicted in FIG. 3, the traces 301, 302 depict two signals that are present in the environment, and which overlap for a period of time between times t2 to t3. The composite sum of signals 301 and 302 is represented as composite detector envelope 320. In this example, a detection threshold 305 (e.g., threshold level #5) is aligned with signal 301, while detection threshold 312 (threshold level #2) is aligned with signal 302. It is noted that from time t2 to t3, the composite waveform 320 exceeds threshold 306 (threshold level #6) due to constructive addition of the two pulses at the envelope detector output. For ease of illustration, a single RF tag decoder output signal 309 is shown representing the waveform at the RF tag decoder output at threshold levels #3, #4 and #5 (and similarly representative RF tag decoder output 307 at each threshold levels #1 and #2). It is noted that the RF tag decoder output corresponding to threshold level #7 is logic 0 indicating signals 301 and 302 do not trigger detection at threshold level #7.

Referring back to FIG. 1, continuing along the spur mitigation signal path 50, the 3-bit encoded RF tag signal 75 output from the multi-level threshold detector 70 is input to an RF Tag Correlator system 80 that is configured to associate (correlate) each IF Detection out of IF detector unit 40 with the corresponding RF tag level 75. This correlation is necessary because RF tag "reports" may be asynchronous to detection reports, since they are generated from broadband RF inputs that may be outside the tuned detection bandwidth.

Figure 4:
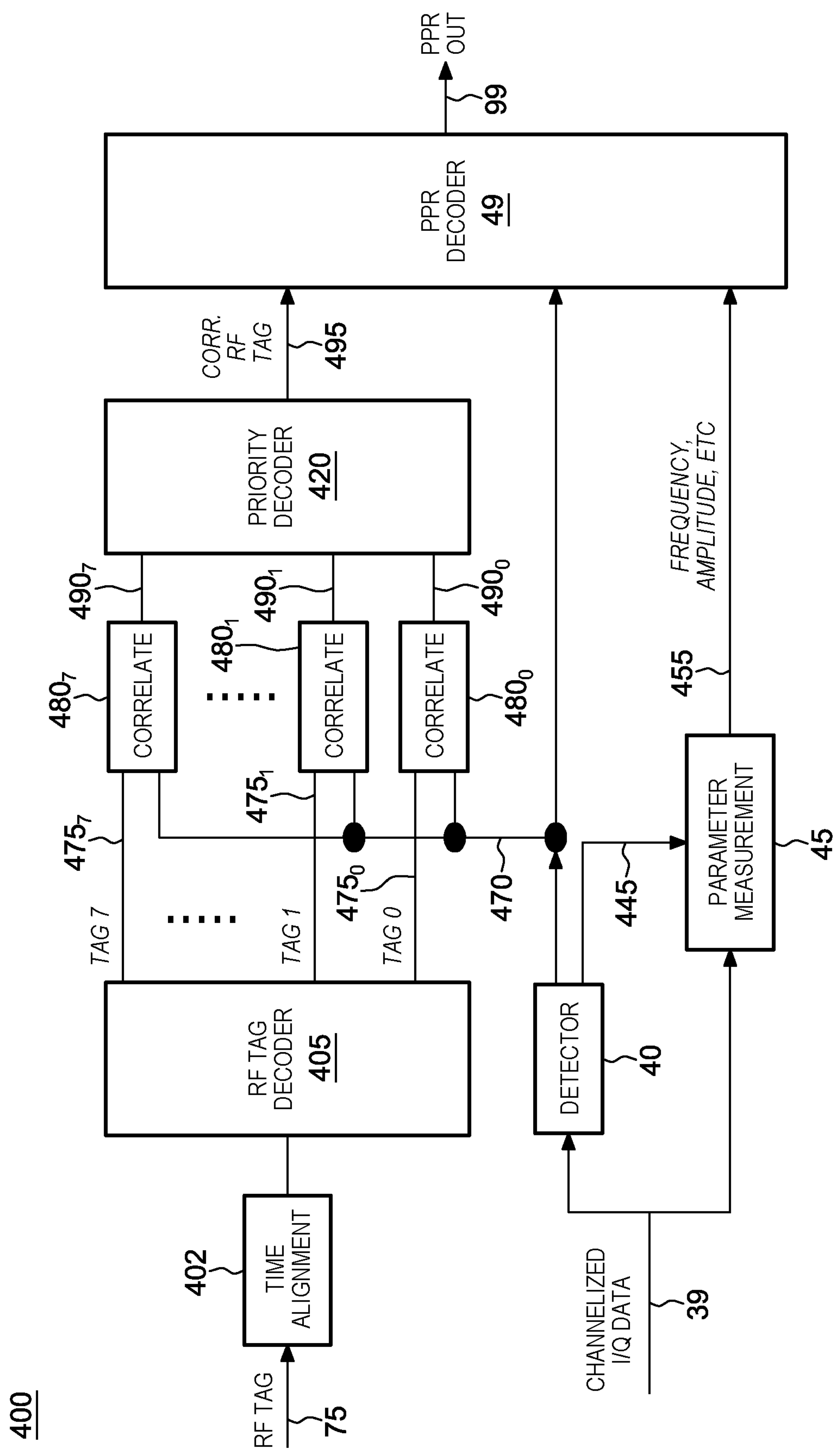
FIG. 4 illustrates detail of RF tag correlator block shown in FIG. 1 receiving the encoded RF Tag generated at the spur mitigation signal path.

FIG. 4 illustrates a system block diagram 400 of the RF Tag Correlation unit 80 of FIG. 1 receiving the encoded RF Tag 75 along the spur mitigation signal path 50.

As illustrated in FIG. 4, a time alignment circuit 402 in the signal path 50 is configured to adjust the delay in that path to match that of the main RF signal path 20. Once time aligned, the encoded RF Tag values 75 are input to an RF Tag decoder 405 configured to decode the 3-bit encoded RF tag signal 75 into separate Tag waveforms $\mathbf{475}_0$, $\mathbf{475}_1$, . . . , $\mathbf{475}_7$ corresponding to each of the detection thresholds. Each respective decoded tag waveform $\mathbf{475}_0$, $\mathbf{475}_1$, . . . , $\mathbf{475}_7$ is applied to a first input of a respective correlator unit, e.g., correlator units $\mathbf{480}_0$, $\mathbf{480}_1$, . . . , $\mathbf{480}_7$. Each respective correlator unit $\mathbf{480}_0$, $\mathbf{480}_1$, . . . , $\mathbf{480}_7$ receives a respective second input 470 that represents a detection event detected by detector 40 and which is a binary value, e.g., logic "1" to indicate detection by detector 40 of a potentially spurious signal, or a logic "0" indicating no detected event. In an embodiment, the output of detector 40 is asserted (e.g., logic "1") for the duration of time that the signal is above a detection threshold. In particular, a second input to each correlator is connected to the I/F detector circuit 40 that monitors the Channelized I/Q narrower bandwidth sub-channel signal output 39 for potential spur or signal condition that meets a spur detection criterion, i.e., a condition corresponding to when a received external signal is strong enough that the resulting spur exceeds a minimum detectable signal. In an embodiment, a detection event corresponds to a potential spur or signal condition detected in channelized I/Q narrower bandwidth sub-channel signal that meet a spur detection criterion. In an embodiment, detection of a potential spur or signal condition detected in channelized I/Q narrower bandwidth sub-channel will invoke a trigger 445 at parameter measurement block 45 to initiate a parameter measurement 445 at the parameter measurement block 45 for measuring certain parameters of any I/Q detected signal at each respective IF sub-band signals detected at detector block 40.

In an embodiment, presence of the detection event output of the I/F detector circuit is input as signal 470 to each correlator unit $\mathbf{480}_o$, $\mathbf{480}_1$, . . . , $\mathbf{480}_7$. Each respective correlator unit $\mathbf{480}_0$, $\mathbf{480}_1$, . . . , $\mathbf{480}_7$ associates (correlates) each input tag waveform (e.g., tag #2, tag #5) with a respective detection event (e.g. a detected pulse) at the channelized I/Q path. A respective correlation output signal $\mathbf{490}_0$, $\mathbf{490}_1$, . . . , $\mathbf{490}_7$ of each respective correlator unit $\mathbf{480}_0$, $\mathbf{480}_1$ . . . , $\mathbf{480}_7$ is asserted when the respective input decoded RF Tag $\mathbf{475}_0$, $\mathbf{475}_1$, . . . , $\mathbf{475}_7$ input to the respective correlator $\mathbf{480}_0$, $\mathbf{480}_1$, . . . , $\mathbf{480}_6$ is active for the entire duration that the detected pulse signal 470 is present. The asserted outputs from each correlator unit $\mathbf{480}_0$, $\mathbf{480}_1$, . . . , $\mathbf{480}_6$ is input to a priority encoder device 420 that determines the highest ranking priority correlator output which is present for the duration of the detected pulse and generates a correlated RF Tag signal 495 representing a highest priority RF tag. This highest ranked priority RF tag 495 is recorded in the generated Pulse Parameter Report 99, along with other measured parameters such as frequency and amplitude from the parameter measurement block 45. This correlated RF tag 495 is converted back to a three-bit signal representing the highest correlated RF tag.

FIG. 3 further illustrates the RF Tag correlation process for the example strong signals 301, 302 depicted. In this example, the two overlapping strong signals 301, 302 result in a composite detected envelope 320 with discrete steps, and RF tag decoder outputs 310 as shown. Spurious detections are generated from the strong signals individually (i.e., a 2nd harmonic spur), and a 3rd spur is generated from the combination of the two strong signals (i.e., a 2-tone 3rd order intercept spur). As shown in FIG. 3, the resulting detector outputs correlate with the RF tag decoder outputs at the correlators $\mathbf{480}_0$, $\mathbf{480}_1$, . . . , $\mathbf{480}_6$ as follows:

In one embodiment, for the example strong signals 301, 302 detected at the RF receiver, a detected spur resulting from strong signal 301 by itself (from time $t_1$ to $t_2$) correlates with RF tag decoder outputs (threshold) #1 through decoder output (threshold) #5 for its entire duration. This detected spur is flagged by a correlator unit as level 5, because, as determined by the priority encoder 420, the tag level 5 correlator is the highest correlator output that is present for the entire duration of the pulse. FIG. 3 depicts the "spur" 321 flagged at "level 5" resulting from the first strong signal #1 (SS1) 301 (by itself) detected in the environment.

The detected spur resulting from Strong Signal 302 by itself (time $t_2$ to $t_4$) correlates with RF tag decoder outputs (threshold) #1 and output (threshold) #2 for the entire duration. This detected spur is flagged by a correlator unit as level 2 because, as determined by the priority encoder 420, the tag level 2 correlator is the highest correlator output that is present for the entire duration of the pulse (e.g., between t2 and t4). As shown in FIG. 3, there is depicted the "spur" 322 flagged at "level 2" resulting from presence of the second strong signal #2 (SS2) 302 (by itself) detected in the environment.

The detected spur resulting from the combination of strong signal 301 and strong signal 302 (during time t2 to t3) correlates with RF tag decoder output level 6 for the entire duration. This detected spur is flagged by a correlator unit as level 6 because, as determined by the priority encoder 420, the tag level 6 correlator is the highest correlator output that is present for the entire duration of the pulse. FIG. 3 shows a further "spur" signal 330 flagged at a "level 6" results from the combination of the signals 301 and 302 detected in the environment.

Referring back to FIG. 4, in an embodiment, at the PPR encoder block 49 used for generating a Pulse Parameter Report 99, each report 99 including a resulting correlated RF tag field 495 and is appended with the associated parameter measurements 455 (e.g., amplitude and frequency) output of the parameter measure block 45, to form the Pulse Parameter Report. System software at the RF receiver sub-system uses these PPR reports 99 as the basis for subsequent detection processing.

In an embodiment, as shown in FIG. 1, the generated pulse reports 99 are propagated to a processor configured to run software performing a spur rejection function 100, which operates to determine whether the Pulse Parameter Report is passed on as a valid detection, or rejected as a possible spurious detection. Spur rejection block 100 receives an associated report threshold 110 from the report threshold database 68 as selected by threshold select block 65. This report threshold selection is associated with the corresponding detection threshold selections associated with hardware state setting 73 (e.g., high gain state, low gain state, etc.) used when assessing spurious signals. In an embodiment, the amplitude of each pulse reported is compared with a Report Threshold 110 that corresponds to the given hardware state and reported RF tag level. When the amplitude in the pulse report exceeds the report threshold 110, it is passed on as a valid detection, since its value exceeds that of any expected spur. Any pulse whose amplitude is less than the report threshold 110 is rejected by the spur rejection function 100 as a spurious signal. For example, given a detection having a correlated RF tag output 495 (e.g., bits associated with level 6) that corresponds with a report threshold of −40 dBm, then if the measured amplitude of the detected signal is above −40 dBm, then the detected signal will get passed as a real signal; however, if the signal amplitude is less than −40 dBm, it will be rejected as spurious.

Figure 5:
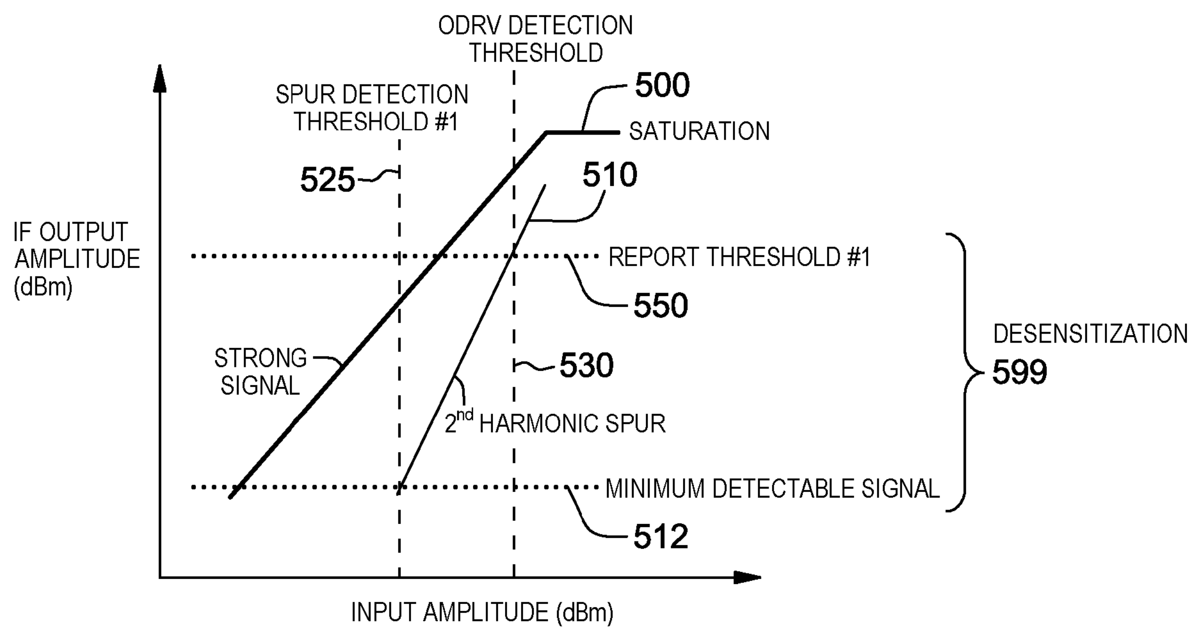
FIG. 5 illustrates conceptual performance of a spur rejection function using a single threshold as depicted in quantitative terms according to an embodiment.
Figure 6:
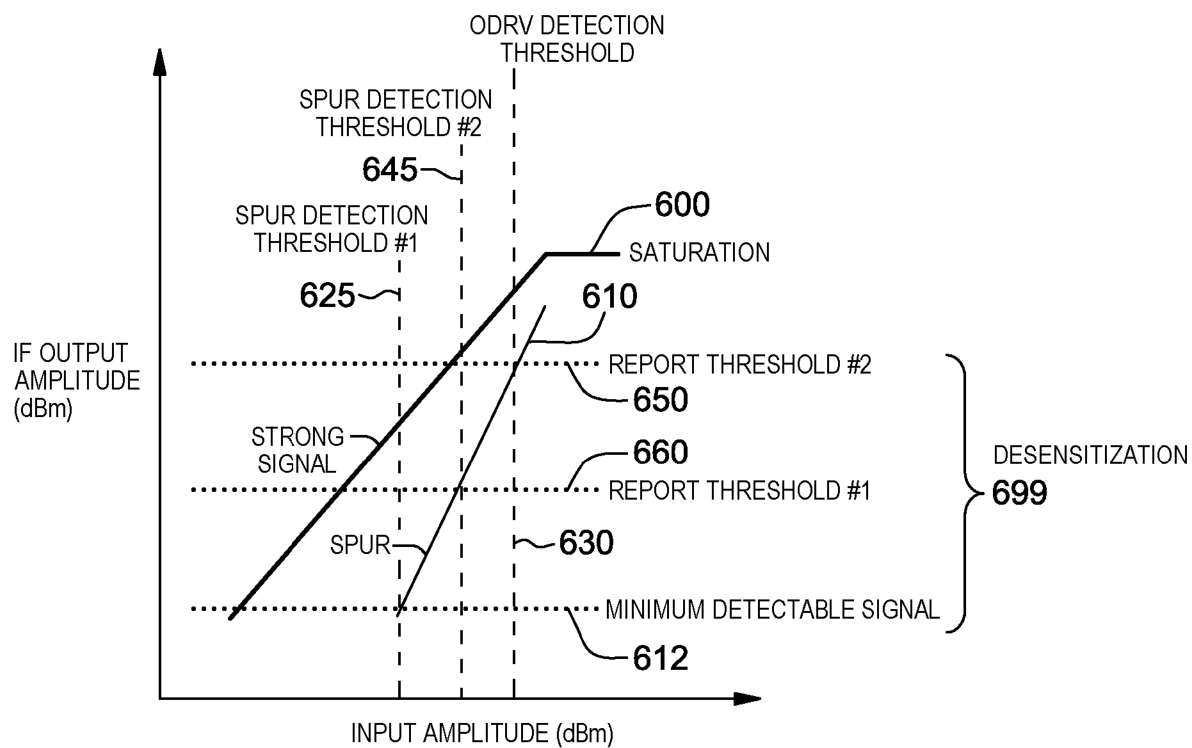
FIG. 6 illustrates conceptual performance of a spur rejection function using multiple thresholds according to an embodiment.

In an embodiment, spur rejection function 100 runs a spur mitigation algorithm as depicted in quantitative terms as shown in FIG. 5 and FIG. 6 which show respective example RF signal plots of IF output amplitude, e.g., in dBm, vs RF signal input amplitudes, e.g., in dBm.

Respective FIG. 5 and FIG. 6 illustrate an example behavior of a strong signal 500, 600, and an example respective 2nd Harmonic spurious signals 510, 610 that may be generated in the RF signal path 20. As the strong signal power increases, the detected IF output amplitude increases in a linear (e.g., 1 dB per dB) manner until the signal hits saturation level, while the corresponding 2nd harmonic spurious rises with, for example, a 2 dB per dB slope. For spur detection, the spur detection threshold #1 525 shown in FIG. 5 and the spur detection threshold #1 625 in FIG. 6 are each set at a power level corresponding to the strong signal power which results in the level of the $2^{nd}$ harmonic spur exceeding the system's Minimum Detectable Signal 512 which is the lowest level at which a spur may cause a false report and is the signal level (e.g., in dBm) at which the receiver achieves a probability of detection that is greater than a required limit, and a probability of false alarm that is lower than a required limit, as limited by the internal noise floor of the receiver chain. As an example, for a second harmonic spur, the signal level that would cause a spur which exceeds MDS is given by the equation (MDS+IIP2)/2 where IIP2 is the input referred second order intercept point used to predict second harmonic spurs (in dBm). Generally, for nth order harmonic spurs characterized by an intercept point IIPn, a relation Psignal=[MDS+IIPn(N−1)]/N] is used to determine the level of a signal (Psignal) that would cause a spur exceeding MDS. For example, for a $3^{rd}$ harmonic spur, a detectable spur event occurs when input signal power=[MDS+2*IIP3]/3.

In view of the example plots shown in respective FIGS. 5 and 6, any pulse report with reported amplitude less than this threshold 525, 625 will be given an RF Tag value of 0, for which no rejection occurs. Any pulse with amplitude greater than the detection threshold will be tagged with an RF tag value of 1. Pulses with RF tag value of 1 are rejected if they are less than the report threshold, and passed if they are greater than the report threshold. While the Report Threshold is ideally equal to the worst case spur resulting from a signal which triggers the corresponding detection threshold, in an embodiment, a small "Breach Margin" is added onto the computed spur level when the report threshold is set in order to allow for errors inherent to the spur prediction.

Corresponding to the example embodiment depicted in FIG. 5, the Report threshold #1 550 is set to correspond to the IF output amplitude that results when input is driven at an amplitude level corresponding to an ODRV (Overdrive) threshold level 530. The ODRV threshold level 530 is used to indicate the onset of saturation (i.e., when the system becomes non-operational or unacceptably degraded). In the example shown in FIG. 5, there are no other states between spur detection threshold #1 525 and the ODRV threshold 530, so when a report 550 has been tagged as exceeding RF tag #1, but has not exceeded the ODRV threshold, the spur rejection can only assume that the value is less than the spur value corresponding to the ODRV detection threshold, and the report threshold must be set accordingly. This can result in a very large degradation in the sensitivity 599, and a reduction in the two signal dynamic range, as shown in the dynamic range vs. input power that is plotted in FIG. 7.

As shown in FIG. 6, in an example, there is added an additional spur detection threshold #2 645 that is intermediate the spur detection threshold #1 625 and an overdrive (ODVR) threshold level 630. By adding additional detection thresholds 645 between spur detection threshold #1 625 and the ODRV detection threshold 630, the overall performance of the algorithm can be made significantly more robust, as illustrated in FIG. 6. That is, given the additional information that is provided by this detection threshold 645, the algorithm can be tuned to support an additional corresponding report threshold, e.g., report threshold #1 660 which lies between the first report threshold corresponding to the minimum detectable signal threshold 612 and the report threshold associated with ODRV detection, i.e., report threshold #2 650.

This adding of additional detection thresholds results in a significantly smaller step reduction in dynamic range 699 as shown in FIG. 6. Better fidelity and increased sensitivity and resolution (desensitization decreases) is achieved with additional detection thresholds and report thresholds, e.g., eight (8) or more thresholds. Further benefit can be achieved by adding additional states (detection thresholds and report thresholds) until the resulting step size has been reduced to acceptable levels. This allows the dynamic range degradation to be optimized, as shown in FIG. 7.

Figure 7:
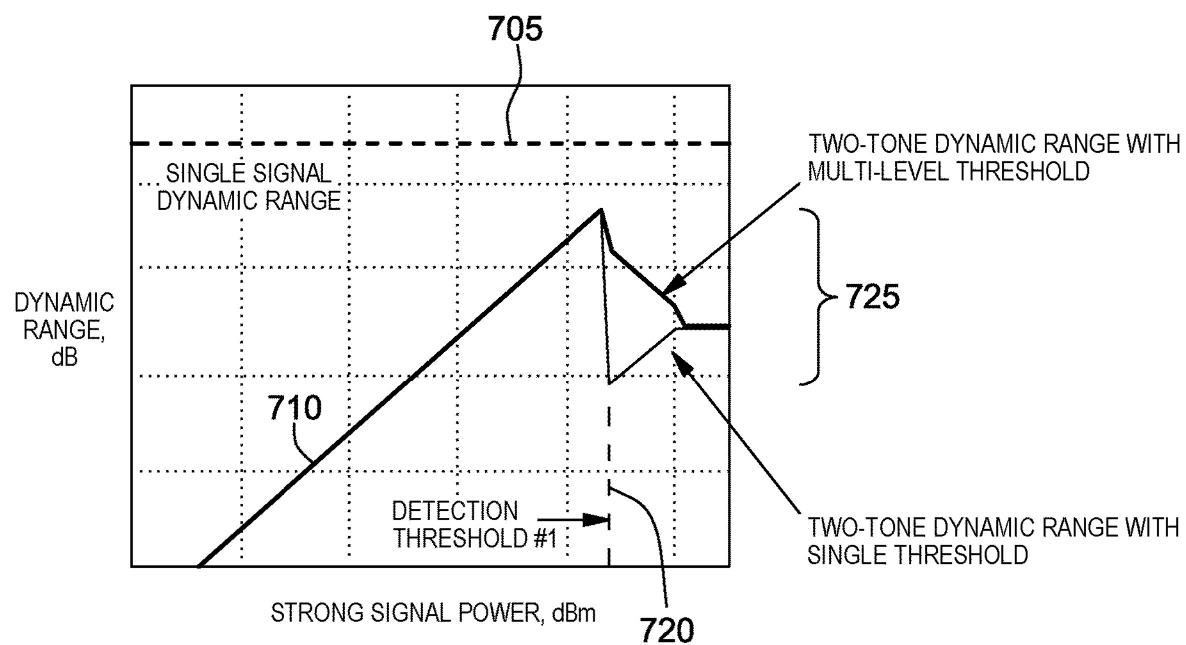
FIG. 7 illustrates comparative Dynamic Range benefit of using multiple thresholds vs. single thresholds.

In particular, FIG. 7 shows a plot 700 depicting the improvement in multi-tone dynamic range for the receiver device of FIG. 1. As depicted in FIG. 7 showing a plot 700 of the dynamic range (in dB) vs. received input signal strength (in dBm) for both a single signal 705 and a two-tone signal 710. FIG. 7 particularly shows the peak multi-tone dynamic range is maintained over a much broader range of input signal conditions. There is particularly shown the improvement 725 (a decreased desensitization) of the multi-tone dynamic range for signals near the spur tagging threshold due to multi-level spur detection thresholds in the receiver as compared to the multi-tone dynamic range with single detection threshold 720.

One factor in the successful implementation of the spur mitigation algorithm is the generation of detection and report thresholds. For optimum performance, the detection and report thresholds are most tightly linked to the spur characteristics of the hardware over frequency, gain state, and input power, etc. In an embodiment, a receiver hardware state comprises one or more parameters including, but not limited to: a gain state, a RF receiver sensitivity, a Sub-band frequency, a selected type of receiver front end, a connected antenna aperture, or combinations thereof.

However, production hardware typically shows significant amount of variation in performance across all of the parameters. If the detection and report thresholds were set based on the worst case behavior, the resulting dynamic range of the system would have sub-optimal performance. Furthermore, the actual performance can vary significantly based on production hardware variations.

Figure 8:
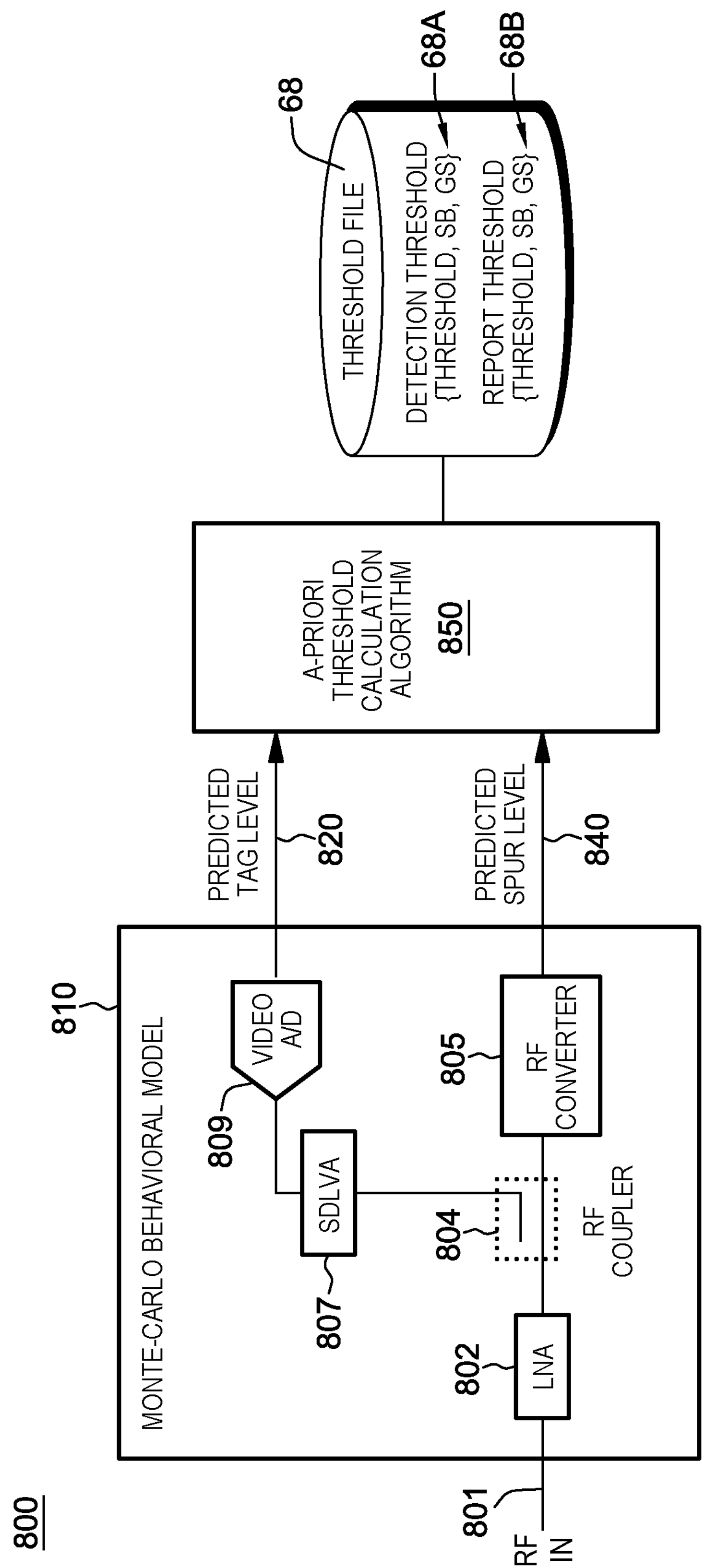
FIG. 8 illustrates a top level system depicting the computing of a threshold detection levels.

To overcome these issues, a machine learned RF system behavioral model for determining optimal detection/report thresholds is generated and used. FIG. 8 illustrates a top level system 800 depicting the computing of a threshold detection levels.

As shown in FIG. 8, the system 800 runs processes for generating and using a Monte-Carlo based behavioral model 810 of the system RF signal path as the basis for the threshold calculations. In an embodiment, model parameters for the behavioral model are associated with a hardware state of a front end of the receiver RF signal path sourcing potential spur signals. In an embodiment, a different behavioral model 810 is associated with different receiver front end hardware/aperture in consideration. The modeled receiver front end models behavior of the hardware components including, but not limited to: the low noise amplifier and tuner 802 receiving the input RF signal 801, the RF Coupler 804 that samples broadband RF Power level at input prior to down conversion at the RF converter 805, the SDLVA amplifier 807 that provides the video output signal capturing the video bandwidth of the tracked broadband input waveform and the video A/D converter 809. Each of the parameters which significantly impacts performance is further modeled using a statistical distribution that reflects production tolerances.

Parametric results from the behavioral model 810 are used by an a-priori threshold calculation algorithm 850 for computing the multi-level (e.g., eight) detection and report thresholds the data of which can be collectively for storage as files in a memory storage system, e.g., look-up table or database 68. For example, detection threshold data 68A and report threshold data 68B can be stored as a data triplet with the threshold and associated gain state (GS) and sub-band (SB) parameters. The system 800 runs processes for predicting RF message tag parameters 820 and corresponding predicted spur levels 840 generated based on the behavioral model 810 and runs the threshold detection algorithm 850 for determining optimal detection/report thresholds based on the behavioral model 810 of the RF receiver system. As an example, the threshold calculation algorithm 850 will generate, based on a type of the detected spur signal type that is dominant (e.g., a LO-induced spur, a $2^{nd}/3^{rd}$ harmonic spur, a mixer spur) corresponding detection and report thresholds based upon a detected dominant spur. Given that there can be more than one type of spur generated (e.g., second harmonic, third harmonic, etc), the detected spur that has the strongest amplitude is the dominant spur.

In an embodiment, the RF receiver system behavioral model 810 simulates multiple, dominant sources of spurious signals (e.g., second/third harmonics, LO (Local Oscillator) induced spurs, and mixer spurs) and simulates their individual behavior over frequency, gain state, and hardware path. The examples shown in FIGS. 5 and 6 illustrate predicted performance of second harmonic spurs, which typically have a 2 dB increase in spur per 1 dB rise. Higher order spurs typically have a higher slope (i.e., 3 dB increase in spur per 1 dB increase in signal for 3rd harmonic spurs).

Additionally, the model 810 models behavior of the RF converter 805 which can have significantly higher spurious due to mixer terms and/or Local Oscillator induced spurs when tuned to some settings. Each of these spurs can vary significantly over the range of production hardware, due to gain variations that can occur in each stage of the receiver subsystem.

The threshold detection algorithm 850 accounts for this variation using the Monte-Carlo behavioral model 810 that simulates operation of the receiver front end system for use in predicting a corresponding spur level for each detected spur term. In an embodiment, a predicted RF Spur level is the level of the RF spur resulting from a given input condition. The generated report threshold 110 is set based on the maximum value for each spur type, across the range of Monte-Carlo simulation trials. A small "Breach Margin" factor is added to a worst case value, to ensure that spur reports do not "Breach" the report threshold 110. This ensures a low probability of false report, while maximizing the effective multi-tone dynamic range.

In an embodiment, the method includes variations that allow the report thresholds 110 to be adaptively computed. In the example shown in FIG. 8, while the detection and report thresholds are computed on an a-priori basis, using the machine learned Monte-Carlo behavioral model, the detection and report thresholds can also be computed based on a real-time operating characterization approach. In some system configurations, there may be redundant signal paths which provide alternative mechanisms for determining when a spurious detection occurs. This information can be further used to train the detection and report thresholds. This would provide the ability to selectively reject spurious detections based on the operating characteristics of a given set of system hardware, rather than based on the worst case conditions predicted by a behavioral model.

Figure 9:
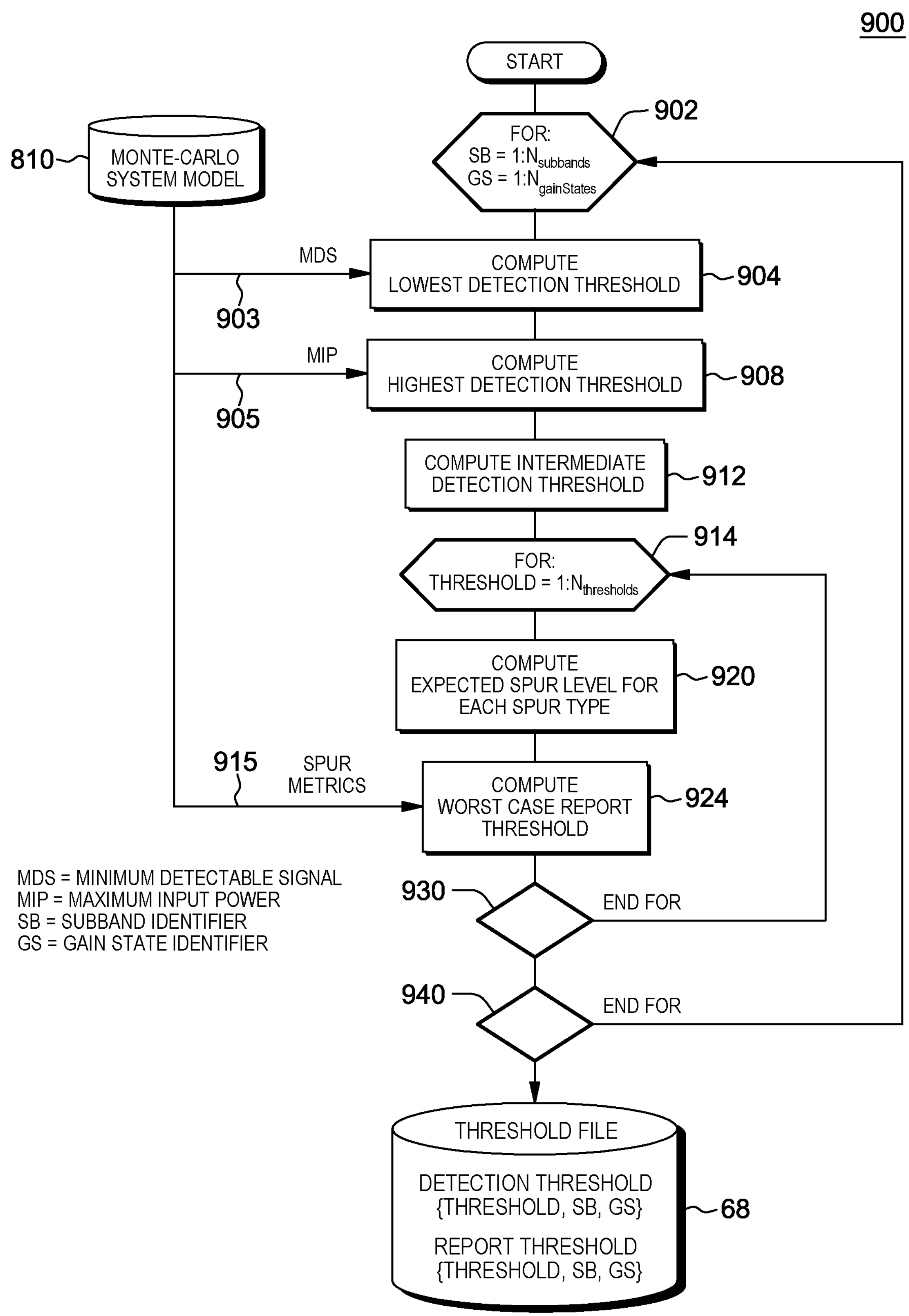
FIG. 9 is a flow chart representation of a method used to compute the detection and report thresholds according to an embodiment.

FIG. 9 depicts a flow chart representation of a method 900 used to compute the detection and report thresholds based on the predicted tag level and predicted spur level generated by the model according to an embodiment. In an embodiment, FIG. 9 depicts the a-priori threshold calculation algorithm 850 for computing the detection and report thresholds based upon parametric results from the behavioral model 810 for use in populating look-up table 68 with detection threshold values.

In a first step 902 begins a FOR loop that will run through each of N detection threshold states SB=1:$N_{subbands}$ and GS=1:$N_{gainstates}$. At 904, the method calculates a lowest detection threshold based on the weakest possible input signal that can result in a spur which exceeds a system Minimum Detectable Signal (MDS) value 903. This signal level is then converted to a signal level that is referenced to the detector input by accounting for the gain from system input to the detector. Production component variations may cause significant variation in this value from system to system, so a worst case value is determined based on the set of data predicted by the Monte-Carlo simulation trials. The resulting programmed minimum detection threshold must be consistent with the sensitivity of the video detector.

At 908, the method calculates a highest detection threshold based on the systems Maximum Input Power (MIP) value 905 at which the RF signal path becomes nonoperational or unacceptably degraded, i.e., when the input signal is strong enough that it forces the receiver path hardware into a highly nonlinear operating mode, resulting in parameter measurements (such as amplitude) that have degraded to the point that they are non-compliant to system accuracy requirements. Above this threshold, reported signal levels will be unreliable and excessive spurs may occur. As with detection threshold 1, the Monte-Carlo simulation trials are evaluated to determine the worst case value for this parameter.

At 912, the method calculates intermediate detection thresholds based on the values for the lowest and highest detection thresholds. The intermediate thresholds may be evenly spaced between the lowest and highest values, or follow a non-linear spacing as necessary to provide optimum system performance.

At 914 begins an internal FOR loop that will run through each of N detection threshold states Threshold=1:$N_{thresholds}$. Within this internal FOR loop are methods for computing expected spur level's for each of the detection thresholds (spur types) determined above, based on the spur metrics 915 provided by the system behavioral model. A system spur metric is generally defined as any design parameter that allows one to predict the spur level for given input condition(s). Typical spur metrics include second and third order intercept points, from which second harmonic and third harmonic spur levels can be computed. Other design metrics may be used to predict performance of non-harmonic spurs.

Detection levels based on other spur metrics include those of dominant spur sources such as local oscillator (LO) spurs and mixer spurs specific to the hardware architecture are also evaluated as needed. Each of the spur levels described above may have different behavior as a function of signal frequency and signal levels. For instance, second harmonic spurs typically have a 2 dB increase in spur per 1 dB rise. Higher harmonic spurs will typically have a higher slope (i.e., 3 dB increase in spur per 1 dB increase in signal for 3rd harmonic spurs). At low threshold values, the second harmonic spur may be dominant, while at higher threshold values, the third harmonic may be dominant.

At 924, the method generates a report threshold computed based on the worst case value of each spur type, for the associated detection threshold. The spur rejection algorithm operates based on the signal levels as reported at the output of the signal path, so the Report Thresholds must also be referenced to this point. This is achieved by applying the overall path gain for each Monte-Carlo trial, and recording the worst case value. As shown in FIG. 9, the steps 914-930 are iterated for each of the N thresholds.

In an embodiment, for a general case of an $n^{th}$ order intercept point, a predicted RF spur level=n*Psig−(n−1)*IIPn which is factored to express spur level as a function of signal power (Psig), instead of signal level that causes spur at a given level. In this predicted RF spur level equation, the spur level is referenced to the input of the receiver. When determining the report threshold, signal levels as measured at the output of the receiver are used. The computed value given above gets multiplied by the gain of the system to determine a report threshold. The $n^{th}$ order intercept point values used in the equation are examples of "system spur metrics".

The outer FOR loop steps 904-940 are repeated for each tunable frequency sub-band and gain state/path configuration. The resulting detection threshold and report threshold values for each condition are recorded in a multi-dimensional look-up table. The resulting table is used to set the proper detection and report thresholds during real-time execution of the spur mitigation algorithm.

The use of multiple detection and report thresholds optimizes the effective range over which peak Multi-Tone Dynamic range is achieved, while maintaining a low false report rate. Further, the use of multiple detection and report thresholds also provides resolution needed to support mitigation of spurs resulting from a wide range of broadband RF imperfections. Although embodiments described herein are used in broadband applications, they can also find utility in some narrow-band applications. The spur mitigation path 50 is of a low complexity that allows for efficient implementation, with minimal additional hardware/software/firmware complexity. The architecture supports multiple ways to partition the spur processing, i.e., between either firmware or software resources.

Use of spur mitigation techniques as described allows designers the flexibility to make tradeoffs that support best use of production hardware, as needed based on tradeoffs for size, weight, power, and cost. Note that the invention is extendable to also support operation with higher performing hardware.

The use of high fidelity RF behavioral model and automated threshold detection algorithm to determine detection and report thresholds, further supports optimizing the ability to minimize false reports while maximizing the range over which peak multi-tone dynamic range is achieved.

The methods described here are further scalable to include detection feedback from multiple detectors in the receive path. For example, it is envisioned that a separate detector could be implemented at each of the different RF preselectors. This would provide the ability to more selectively reject spurious detections only when the strong signal conditions that would cause a spur exist in the corresponding frequency range where they would cause a spurious detection. This aspect would enable improved optimization of the ability to maintain high false report suppression with optimal dynamic range.

Further the approach described herein complements other spur mitigation schemes that may be used in conjunction with the approach described herein.

Figure 10:
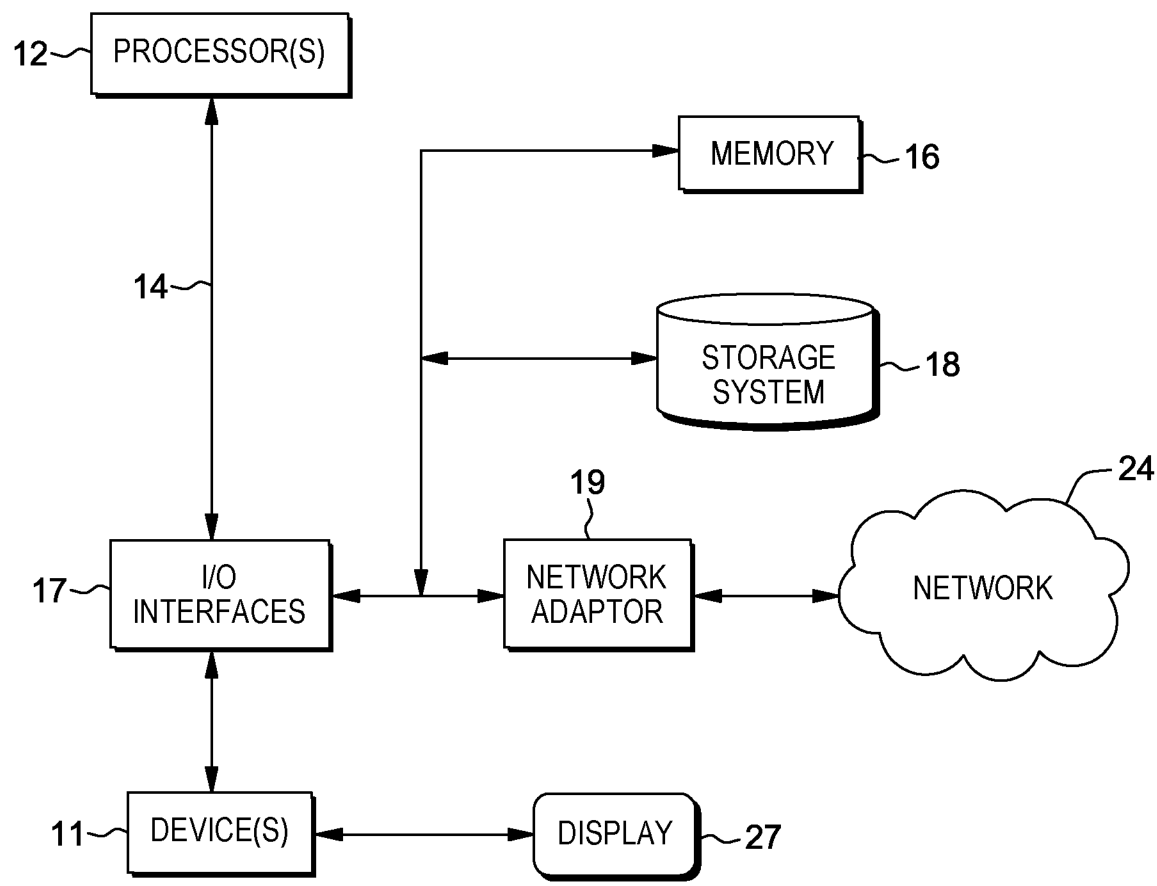
FIG. 10 is an exemplary block diagram of a computer system in which processes involved in the system, method, and computer program product described herein may be implemented.

The methods described herein with respect to FIGS. 8 and 9 can be run on any suitable processing system such as computer system 1 shown in FIG. 10 that may be implemented using any of numerous general purpose or special purpose computing system configurations.

FIG. 10 generally illustrates an example computing system in accordance with the present disclosure that may provide the services and functions associated with methods described herein with respect to FIGS. 8 and 9. It is to be understood that the computer system depicted is only one example of a suitable processing system and is not intended to suggest any limitation as to the scope of use or functionality of embodiments of the present invention. For example, the system shown may be operational with numerous other general-purpose or special-purpose computing system environments or configurations. Examples of well-known computing systems, environments, and/or configurations that may be suitable for use with the system shown in FIG. 1 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In some embodiments, the computer system may be described in the general context of computer system executable instructions, embodied as program modules stored in memory 16, being executed by the computer system. Generally, program modules may include routines, programs, objects, components, logic, data structures, and so on that perform particular tasks and/or implement particular input data and/or data types in accordance with the methods described in FIGS. 8-9.

The components of the computer system may include, but are not limited to, one or more processors or processing units 12, a memory 16, and a bus 14 that operably couples various system components, including memory 16 to processor 12. In some embodiments, the processor 12 may execute one or more modules that are loaded from memory 16, where the program module(s) embody software (program instructions) that cause the processor to perform executing the Monte-Carlo behavioral model simulations, the a-priori detection and report threshold determining algorithm computations, and the spur mitigation techniques. In some embodiments, a module may be programmed into the integrated circuits of the processor 12, loaded from memory 16, storage device 18, network 24 and/or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system may include a variety of computer system readable media. Such media may be any available media that is accessible by computer system, and it may include both volatile and non-volatile media, removable and non-removable media.

Memory 16 (sometimes referred to as system memory) can include computer readable media in the form of volatile memory, such as random access memory (RAM), cache memory and/or other forms. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

The computer system may also communicate with one or more external devices 11 such as a keyboard, a pointing device, a display 27, etc.; one or more devices that enable a user to interact with the computer system; and/or any devices (e.g., network card, modem, etc.) that enable the computer system to communicate with one or more other computing devices. Such communication can occur via Input/Output (I/O) interfaces 17.

Still yet, the computer system can communicate with one or more networks 24 such as a local area network (LAN), a general wide area network (WAN), and/or a public network (e.g., the Internet) via network adapter 19. As depicted, network adapter 19 communicates with the other components of computer system via bus 14. It should be understood that although not shown, other hardware and/or software components could be used in conjunction with the computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. An adaptive spurious signal detection system for a radio frequency (RF) receiver system comprising:

a multiple-level threshold detector for receiving a sampled RF signal from the RF receiver system at a given point of time and comparing the sampled RF signal against a plurality of detection threshold levels, said multi-level threshold detector generating a corresponding multi-bit RF tag message, indicating a highest level of the sampled RF signal for the given point in time;

a correlator unit configured to associate an intermediate frequency (IF) signal detection event at the given point of time with a corresponding RF tag level of the generated multi-bit RF tag message for the given point in time, said correlator unit outputting a correlated RF tag message based on the association;

a pulse report generator for generating a corresponding pulse report including said correlated RF tag message and a measured signal parameter of a corresponding detected IF signal associated with the IF signal detection event; and a processor using said correlated RF tag message and the measured signal parameter of said detected IF signal to reject the pulse report as a spurious signal detection or pass the pulse report as a valid signal detection.

2. The detection system of claim 1, wherein the measured signal parameter is a signal amplitude of the detected IF signal, said processor comparing said signal amplitude against a corresponding report threshold associated with an amplitude of an expected spurious signal type and performs one of:

passing said pulse report of the valid signal detection for subsequent detection processing when the signal amplitude of the detected IF signal exceeds the corresponding report threshold; or rejecting said pulse report of the spurious signal detection when the signal amplitude of the detected IF signal is less than the corresponding report threshold.

3. The detection system of claim 2, wherein the corresponding report threshold is a value that maximizes a range over which a peak multi-tone dynamic range for spurious signal event detection is achieved.

4. The detection system of claim 1, further comprising:

a memory having a stored data set of pre-programmed detection threshold levels, said processor selecting said multiple detection threshold levels from the pre-programmed detection threshold levels based on an active configured RF receiver hardware state.

5. The detection system of claim 1, further comprising:

an IF detector circuit in said RF receiver system for monitoring signals generated in the RF signal path and determining said intermediate frequency (IF) signal detection event meeting a spur signal detection criterion.

6. The detection system of claim 5, further comprising:

a decoder for decoding the received RF tag message into a plurality of separate RF tag waveforms corresponding to the multiple detection threshold levels; and said correlator unit comprising:

plural correlators, each correlator correlating a level of a respective RF tag waveform level with the IF signal detection, event;

a first input of a respective correlator receiving the respective RF tag waveforms; and a second input to each of said plural correlators receiving the IF signal detection event, the respective correlator asserting an output when both the RF tag waveform input and detected IF signal event input to the correlator are active for an entire duration of the IF signal detection event.

7. The detection system of claim 6, further comprising:

a priority encoder for determining a highest ranking priority correlator output which is present for the entire duration of the IF signal detection event, and reporting the highest ranking priority correlator as a correlated RF tag signal.

8. The detection system of claim 1, wherein a receiver hardware state has associated one or more RF signal path configuration parameters selected from: a gain state, a RF receiver sensitivity, a sub-band frequency, a selected type of receiver front end, a connected antenna aperture, wherein combinations of said RF signal path configuration parameters are used in determining the detection threshold levels.

9. The detection system of claim 8, wherein said processor is configured to execute instructions to perform:

a machine learned behavioral model for simulating a behavior of a receiver hardware state configuration, said machine learned behavioral model trained to correlate a combination of the RF signal path configuration parameters with a predicted RF spur level and a corresponding RF tag level.

10. The detection system of claim 9, the processor being further configured to:

generate the detection threshold levels and corresponding report thresholds based on said predicted RF spur level and corresponding RF tag level, wherein to generate the detection threshold levels, the processor is configured to:

calculate a lowest detection threshold based on a weakest possible input signal that can result in an RF spur having with the RF spur level exceeding a system minimum detectable signal value;

calculate a highest detection threshold and corresponding RF spur level based on a system maximum input power at which the RF signal path becomes non-operational, and calculate one or more intermediate detection thresholds and corresponding RF spur levels each calculated based on the lowest detection threshold and highest detection threshold.

11. The detection system of claim 10, wherein the processor is further configured to:

calculate said one or more intermediate spur detection thresholds based on system spur metrics provided by said machine learned behavioral model, said spur metrics comprising design metrics from which RF spur levels are predicted.

12. A method for adaptive spurious signal detection in a radio frequency (RF) receiver system, said method comprising:

obtaining, at a given point in time, an RF signal level sample of received RF signals;

comparing, at a multiple-level threshold detector, the RF signal level sample against a plurality of detection threshold levels indicating whether the received RF signals are a signal of interest or a spurious signal, and generating a multi-bit RF tag message indicating a highest level of the RF signal level samples for the given point in time;

associating, using a correlator unit, an IF signal detection event at the given point of time with a corresponding RF tag level from the multi-bit RF tag message for the given point in time, and outputting a correlated RF tag message; and receiving, at a processor, a corresponding pulse report including said correlated RF tag message and a set of IF signal parameters of a corresponding detected IF signal associated with an IF signal detection event; and based on said correlated RF tag message and the signal parameters of said pulse report, perform one of the following based on a report threshold:

rejecting the pulse report as a spurious signal detection; or passing the pulse report as a valid signal detection.

13. The method of claim 12, wherein the report threshold is a value that maximizes a range over which a peak multi-tone dynamic range for spurious signal event detection is achieved.

14. The method of claim 12, further comprising:

storing, in a memory, a data set of pre-programmed detection thresholds, each stored pre-programmed detection threshold being a function of a state of the RF receiver system, and selecting, by said processor, said detection threshold levels from the data set of pre-programmed detection thresholds based on an active configured RF receiver system state.

15. The method of claim 12, further comprising:

monitoring, using a detector circuit in a RF signal processing path, signals generated in the RF signal processing path; and detecting said intermediate frequency (IF) signal detection event meeting a spur signal detection criterion.

16. The method of claim 15, further comprising:

decoding, using a decoder, the RF tag message into separate RF tag waveforms corresponding to each of the detection threshold levels; wherein said correlating further comprises:

correlating, at respective plural correlators, a respective level of the respective RF tag waveform with the IF signal detection event, each respective correlator:

receiving, at a first input, respective one of the RF tag waveforms;

receiving, at a second input, the IF signal detection event, and outputting, at a correlator unit, a respective RF tag message when both the RF tag waveform input to the correlator and the IF signal detection event input to the correlator are active for an entire duration of the detection event.

17. The method of claim 12, wherein said producing said correlated RF tag message comprises:

determining, at a priority encoder, a highest ranking priority correlator output which is present for a duration of the IF signal detection event, and reporting the highest ranking priority correlator as said correlated RF tag message.

18. The method of claim 12, further comprising:

running, at said processor, a machine learned behavioral model for simulating behavior of a state configuration of the RF receiver system, said model trained to correlate a combination of configuration parameters of the modeled receiver system hardware state configuration with a predicted RF spur level and corresponding RF tag level.

19. The method of claim 18, further comprising:

generating, at the processor, a detection threshold of said multiple detection thresholds and corresponding report thresholds based on said predicted RF spur level and corresponding RF tag level, said generating said detection threshold comprising one or more of:

calculating a lowest detection threshold based on a weakest possible input signal that can result in a spur having a spur level exceeding a system minimum detectable signal value;

calculating a highest detection threshold and corresponding spur level based on a systems maximum input power at which the RF signal path becomes non-operational, and calculating one or more intermediate detection thresholds and corresponding RF spur levels each calculated based on the values for the lowest detection threshold and highest detection threshold.

20. The method of claim 19, further comprising:

calculating, at the processor, said one or more intermediate spur detection thresholds based on system spur metrics provided by said machine learned system behavioral model, said spur metrics comprising design metrics, for predicting a respective second harmonic and third harmonic RF spur levels.

21. A computer program product comprising a non-transitory, computer-readable medium comprising instructions that, when executed by at least one processor, configure the at least one processor to:

receive first data relating to a receiver hardware configuration that receives and processes RF signals;

run a behavioral model for simulating behavior of the receiver hardware configuration, said behavioral model trained to predict a performance of types of spurious RF signals based on a simulated receiver hardware behavior;

correlate a combination of hardware configuration parameters of the simulated receiver hardware with a predicted RF spur detection level and corresponding RF tag level of each of the types of spurious RF signals;

automatically generate a detection threshold and a corresponding report threshold based on said predicted RF spur detection level and corresponding RF tag level; and store said detection threshold and the corresponding report threshold for use in detecting the types of spurious RF signals.

22. The computer program product as claimed in claim 21, wherein said instructions, when executed by at least one processor, further configure the at least one processor to:

detect a dominant spur signal type for a current simulated RF receiver hardware state; and tune, using predicted RF spur detection levels and RF tag levels, detection thresholds to match the behavior of the dominant spur signal type.

23. The computer program product as claimed in claim 21, wherein said instructions, when executed by at least one processor, further configure the at least one processor to:

calculate a lowest detection threshold based on a weakest possible input signal that can result in a spur having a spur level exceeding a system minimum detectable signal value;

calculate a highest detection threshold and corresponding spur level calculated based on a system's maximum input power at which a RF signal path becomes non-operational; and calculate one or more intermediate detection thresholds and corresponding RF spur levels each calculated based on the lowest detection threshold and highest detection threshold.

24. The computer program product as claimed in claim 23, wherein said instructions, when executed by at least one processor, further configure the at least one processor to:

calculate said one or more intermediate spur detection thresholds based on system spur metrics provided by said simulated behavioral model, said spur metrics comprising design metrics from which RF spur levels are predicted.

* * * * *